US010792967B2

(12) United States Patent
Tamura et al.

(10) Patent No.: US 10,792,967 B2
(45) Date of Patent: Oct. 6, 2020

(54) IN-WHEEL MOTOR DRIVE DEVICE

(71) Applicant: NTN CORPORATION, Osaka (JP)

(72) Inventors: Shiro Tamura, Shizuoka (JP); Minoru Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/339,386

(22) PCT Filed: Nov. 7, 2016

(86) PCT No.: PCT/JP2016/082963
§ 371 (c)(1),
(2) Date: Apr. 4, 2019

(87) PCT Pub. No.: WO2018/073977
PCT Pub. Date: Apr. 26, 2018

(65) Prior Publication Data
US 2019/0232747 A1  Aug. 1, 2019

(30) Foreign Application Priority Data

Oct. 17, 2016 (JP) .................................. 2016-203521

(51) Int. Cl.
*B60G 7/00* (2006.01)
*B60K 7/00* (2006.01)
(Continued)

(52) U.S. Cl.
CPC ............... *B60G 7/008* (2013.01); *B60G 3/28* (2013.01); *B60G 7/00* (2013.01); *B60K 7/00* (2013.01);
(Continued)

(58) Field of Classification Search
CPC ...... B60K 7/0007; B60K 17/043; B60K 7/00; B60G 3/20; B60G 3/28
See application file for complete search history.

(56) References Cited

U.S. PATENT DOCUMENTS 5,087,229 A * 2/1992 Hewko ............... B60K 7/0007
180/65.51
5,382,854 A * 1/1995 Kawamoto .......... B60K 7/0007
180/65.6
(Continued)

FOREIGN PATENT DOCUMENTS

EP  3 047 996  7/2016
EP  3 521 087  8/2019
(Continued)

*Primary Examiner* — Hau V Phan
(74) *Attorney, Agent, or Firm* — Clark & Brody LP

(57) ABSTRACT

An in-wheel motor drive device includes a wheel hub bearing unit and a speed reduction unit that decelerates rotation of a motor unit and transmits decelerated rotation to a wheel. A suspension bracket has an upper connecting seat portion connectable with a suspension device, a lower connecting seat portion connectable with the suspension device, and an intermediate area connecting a vehicle rear part of the upper connecting seat portion and a vehicle rear part of the lower connecting seat portion. A notch is provided between a vehicle front part of the upper connecting seat portion and a vehicle front part of the lower connecting seat portion on a front side of the vehicle of the intermediate area. The suspension bracket is attached/fixed to a casing of the speed reduction unit and/or a fixed wheel such that an axis of the wheel hub bearing unit passes through the notch.

6 Claims, 13 Drawing Sheets

(51) Int. Cl.
  *B60K 17/04* (2006.01)
  *F16H 1/06* (2006.01)
  *F16H 57/025* (2012.01)
  *F16H 57/021* (2012.01)
  *B60G 3/28* (2006.01)
  *F16H 57/02* (2012.01)

(52) U.S. Cl.
  CPC .......... B60K 7/0007 (2013.01); B60K 17/043 (2013.01); F16H 1/06 (2013.01); F16H 57/021 (2013.01); F16H 57/025 (2013.01); *B60G 2204/148* (2013.01); *B60K 2007/0038* (2013.01); *B60K 2007/0061* (2013.01); *F16H 2057/02034* (2013.01)

(56) References Cited

U.S. PATENT DOCUMENTS

| | | | | |
|---|---|---|---|---|
| 6,942,049 | B2* | 9/2005 | Shimizu | B60K 7/0007 180/253 |
| 7,958,959 | B2* | 6/2011 | Yogo | B60G 3/20 180/65.51 |
| 8,316,973 | B2* | 11/2012 | Walter | B60K 7/0007 180/65.51 |
| 8,453,774 | B2* | 6/2013 | Nagaya | B60G 3/01 180/65.51 |
| 9,090,142 | B2* | 7/2015 | Lee | B60K 7/0007 |
| 9,731,572 | B2* | 8/2017 | Tamura | B60K 7/0007 |
| 2009/0101424 | A1* | 4/2009 | Suzuki | B60K 17/043 180/65.51 |
| 2012/0181848 | A1* | 7/2012 | Makino | B60K 7/0007 301/6.5 |
| 2012/0217789 | A1* | 8/2012 | Yamamoto | B60G 3/20 301/6.5 |
| 2013/0292993 | A1* | 11/2013 | Yukishima | F16C 19/186 301/6.5 |
| 2013/0307320 | A1* | 11/2013 | Akamatsu | B60L 15/2054 301/6.5 |
| 2014/0300175 | A1* | 10/2014 | Takahashi | B60K 7/0007 301/6.5 |

FOREIGN PATENT DOCUMENTS

| | | |
|---|---|---|
| JP | 2007-168481 | 7/2007 |
| JP | 2007-216928 | 8/2007 |
| JP | 2009-179274 | 8/2009 |
| JP | 2009-286296 | 12/2009 |
| JP | 2015-147491 | 8/2015 |
| JP | 2015-214273 | 12/2015 |
| WO | 20081017945 | 2/2008 |

* cited by examiner

OUTSIDE IN VEHICLE LATERAL DIRECTION ←→  INSIDE IN VEHICLE LATERAL DIRECTION →

IN-WHEEL MOTOR DRIVE DEVICE

TECHNICAL FIELD

The present invention relates to a structure configured to connect an in-wheel motor drive device to a suspension device.

BACKGROUND ART

An in-wheel motor drive device arranged in a hollow area of a wheel is connected to a suspension device on a vehicle body side. Conventionally, for example, one described in Japanese Unexamined Patent Publication No. 2015-214273 (Patent Literature 1) is known as a connecting structure therefor. A housing of an in-wheel motor described in Patent Literature 1 is constituted by a housing body and a lid member. A socket of a ball joint is formed on the lid member. The socket accommodates a ball portion of a ball stud erected at a distal end of a lower arm of a suspension. As a result, the in-wheel motor is connected to the suspension member.

CITATION LIST

Patent Literatures

Patent Literature 1: Japanese Unexamined Patent Publication No. 2015-214273

SUMMARY OF INVENTION

Technical Problem

However, the inventor of the present invention has found out that there is a point that needs to be further improved in the above-described conventional connecting structure. That is, the lid member of Patent Literature 1 also serves as a bottom wall of an oil reservoir and is coupled to the housing body with a bolt. There is a concern that oil leaks from a joint between the housing body and the lid member if an excessive external force acts on the socket of the ball joint from a wheel side. Such oil adheres to the wheel and reduces a frictional resistance between a tire and a ground contact surface, and thus, an oil leakage in the in-wheel motor is not particularly preferable.

In addition, there is a concern about insufficient rigidity of the oil reservoir in the above-described conventional connecting structure. The housing part defining the oil reservoir is generally thin and has low rigidity. There is a concern that the insufficient rigidity of a coupling point between the ball joint and the lid member causes adverse influence on an alignment of the suspension.

In view of the above circumstances, an object of the present invention is to provide a highly reliable in-wheel motor drive device by improving a connecting structure between a suspension device and the in-wheel motor drive device.

Solution to Problem

For such an object, an in-wheel motor drive device according to the present invention includes: a motor unit; a wheel hub bearing unit that has a rotating wheel rotating integrally with a wheel, a fixed wheel arranged coaxially with the rotating wheel, and a plurality of rolling elements arranged in an annular gap between the rotating wheel and the fixed wheel; a speed reduction unit that decelerates rotation of the motor unit and transmits the decelerated rotation to the rotating wheel; a suspension bracket that has an upper connecting seat portion connectable with a suspension device, a lower connecting seat portion connectable with the suspension device, and an intermediate area connecting a vehicle rear part of the upper connecting seat portion and a vehicle rear part of the lower connecting seat portion, and defines a notch between a vehicle front part of the upper connecting seat portion and a vehicle front part of the lower connecting seat portion on a front side of the vehicle of the intermediate area; and a fixing means for attaching and fixing the suspension bracket to a casing of the speed reduction unit and/or the fixed wheel in a posture in which an axis of the wheel hub bearing unit passes through the notch of the suspension bracket.

According to the present invention, the suspension bracket can receive an excessive external force even if the excessive external force is applied from the wheel to the in-wheel motor drive device. Therefore, the excessive external force is hardly transmitted to the casing of the in-wheel motor drive device so that it is possible to protect the in-wheel motor drive device so as not to cause an undesirable deformation. In addition, a rolling bearing and a sensor inside the in-wheel motor drive device, a part attached to the casing, and the like are arranged so as to be close to the notch of the suspension bracket such that axial positions of these rolling bearing and sensor are overlapped with an axial position of the suspension bracket, whereby it is possible to achieve miniaturization of the in-wheel motor drive device. The upper connecting seat portion and the lower connecting seat portion have dimensions in a vehicle longitudinal direction. Incidentally, when the fixing means attaches and fixes the suspension bracket to the casing of the speed reduction unit and the fixed wheel, the casing and the fixed wheel are fixed to each other. Alternatively, when the fixing means attaches and fixes the suspension bracket to the fixed wheel, a second fixing means may be additionally prepared to attach and fix the casing of the speed reduction unit to the fixed wheel. Alternatively, when the fixing means attaches and fixes the suspension bracket to the casing of the speed reduction unit, a second fixing means may be additionally prepared to attach and fix the fixed wheel to the casing of the speed reduction unit. The motor unit drives the rotating wheel. A shape of the fixed wheel may be annular, or one in which a plate member is attached and fixed to an annular fixed wheel body may be used.

As one embodiment of the present invention, the motor unit is arranged to be offset away from the axis of the wheel hub bearing unit, the speed reduction unit further has an input gear coupled to a motor rotary shaft of the motor unit, an output gear coupled to the rotating wheel of the wheel hub bearing unit, and a rolling bearing rotatably supporting the output gear on the casing of the speed reduction unit, and the rolling bearing is arranged in the notch so as not to overlap with the intermediate area of the suspension bracket as viewed in an axial direction of the wheel hub bearing unit. Incidentally, the rolling bearing may be arranged on each of both sides in the axial direction of the output gear, or may be arranged only on one end.

As a preferred embodiment of the present invention, the suspension bracket is arranged such that an axial position of the suspension bracket overlaps with an axial position of the above-described rolling bearing with respect to the axis of the wheel hub bearing unit. According to such an embodiment, it contributes to miniaturization of the in-wheel motor drive device. As another embodiment, the rolling bearing supporting the output gear may be arranged so as not to overlap with one side of the suspension bracket in the axial direction.

As a more preferred embodiment of the present invention, the suspension bracket has an upper butt surface and a lower butt surface, the fixing means is provided on the upper butt surface and the lower butting butt surface to bring the butt surfaces into contact with the casing of the speed reduction unit or the fixed wheel, and the upper butt surface and the lower butt surface are arranged on an outer diameter side of the output gear as viewed in the axial direction of the wheel hub bearing unit. According to such an embodiment, it is possible to enhance attachment rigidity between the suspension bracket and the fixed wheel and/or attachment rigidity between the suspension bracket and the casing. As another embodiment, the upper butt surface and/or the lower butt surface are arranged on an inner diameter side of the output gear.

As one embodiment of the present invention, the suspension bracket is arranged so as not to overlap with a stator of the motor unit as viewed in the axial direction of the wheel hub bearing unit. More preferably, the suspension bracket is arranged so as not to overlap with a stator core forming the main body of the stator. According to such an embodiment, the motor unit is separated from the wheel hub bearing unit and the suspension bracket. Then, an excessive external force applied from the wheel to the wheel hub bearing unit is hardly applied to the stator of the motor unit so that it is possible to prevent the stator from causing an undesirable deformation.

The rotating wheel and the fixed wheel of the present invention may be of an inner ring fixing/outer ring rotating type. Alternatively, as one embodiment, the rotating wheel is an inner ring, the fixed wheel is an outer ring, the wheel hub bearing unit further has a hub attachment which is arranged on an outer diameter side of the outer ring and is attached and fixed to the outer ring, and the suspension bracket is attached and fixed to the hub attachment by the fixing means. According to such an embodiment, the suspension bracket can accept an external force applied from the wheel to the wheel hub bearing unit, and it is possible to prevent the casing of the speed reduction unit and the motor unit from being deformed as the external force is transmitted to the speed reduction unit and the motor unit. Incidentally, the inner ring is not limited to the ring shape as long as the inner ring is arranged coaxially inside the outer ring. The inner ring may be a solid shaft body.

Advantageous Effects of Invention

As described above, according to the present invention, it is possible to improve the connecting structure between the suspension device and the in-wheel motor drive device. Further, it is also possible to avoid deformations of the speed reduction unit and the motor unit caused by the excessive external force acting from the wheel side. In addition, the speed reduction unit casing can be reinforced by the suspension bracket. Further, miniaturization of the in-wheel motor drive device can be achieved by arranging a rotating element or a sensor inside the in-wheel motor drive device in the notch of the suspension bracket.

DESCRIPTION OF EMBODIMENTS

Figure 1:
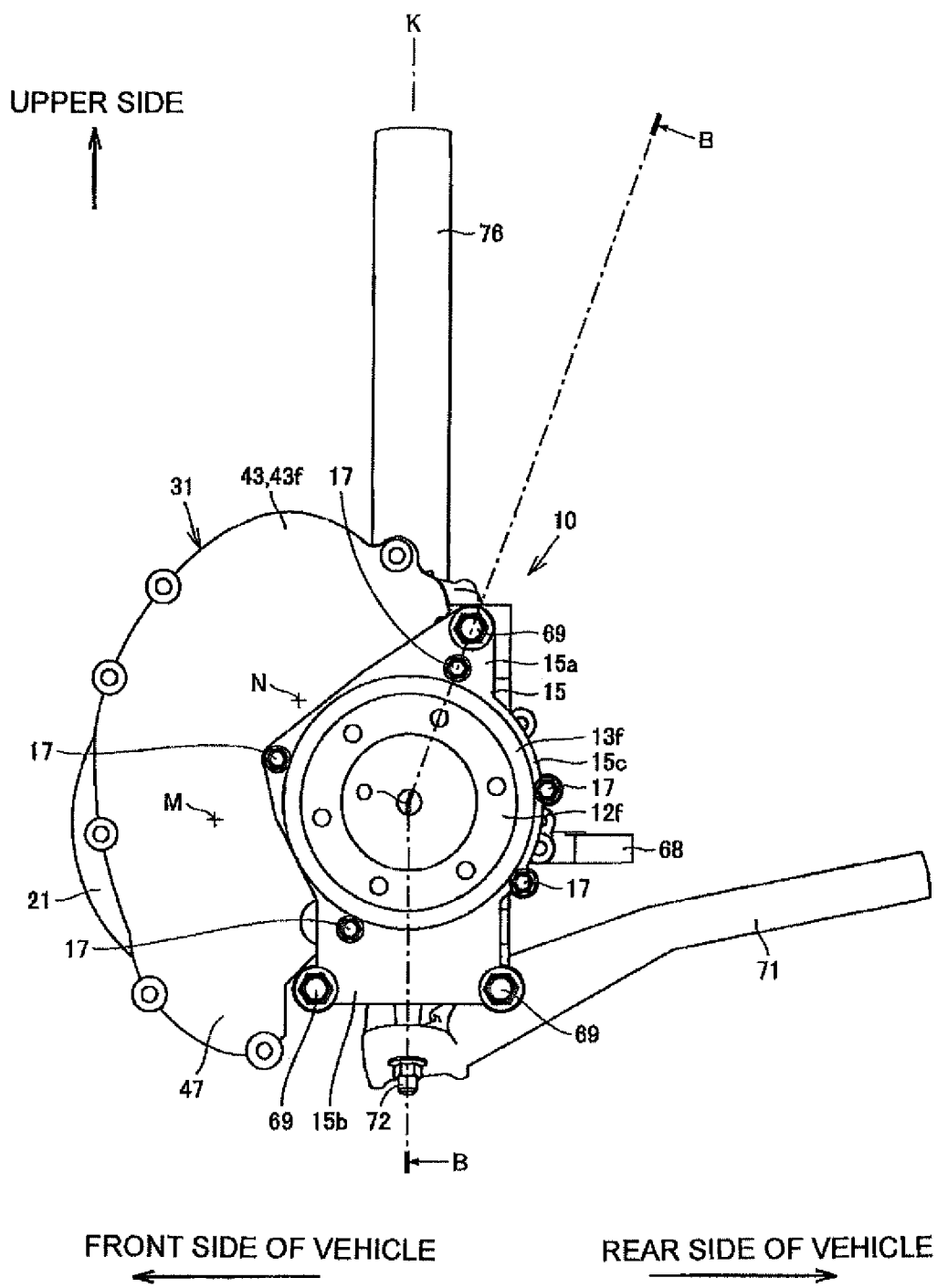
FIG. 1 is a front view illustrating an in-wheel motor drive device according to an embodiment of the present invention together with a suspension device.
Figure 2:
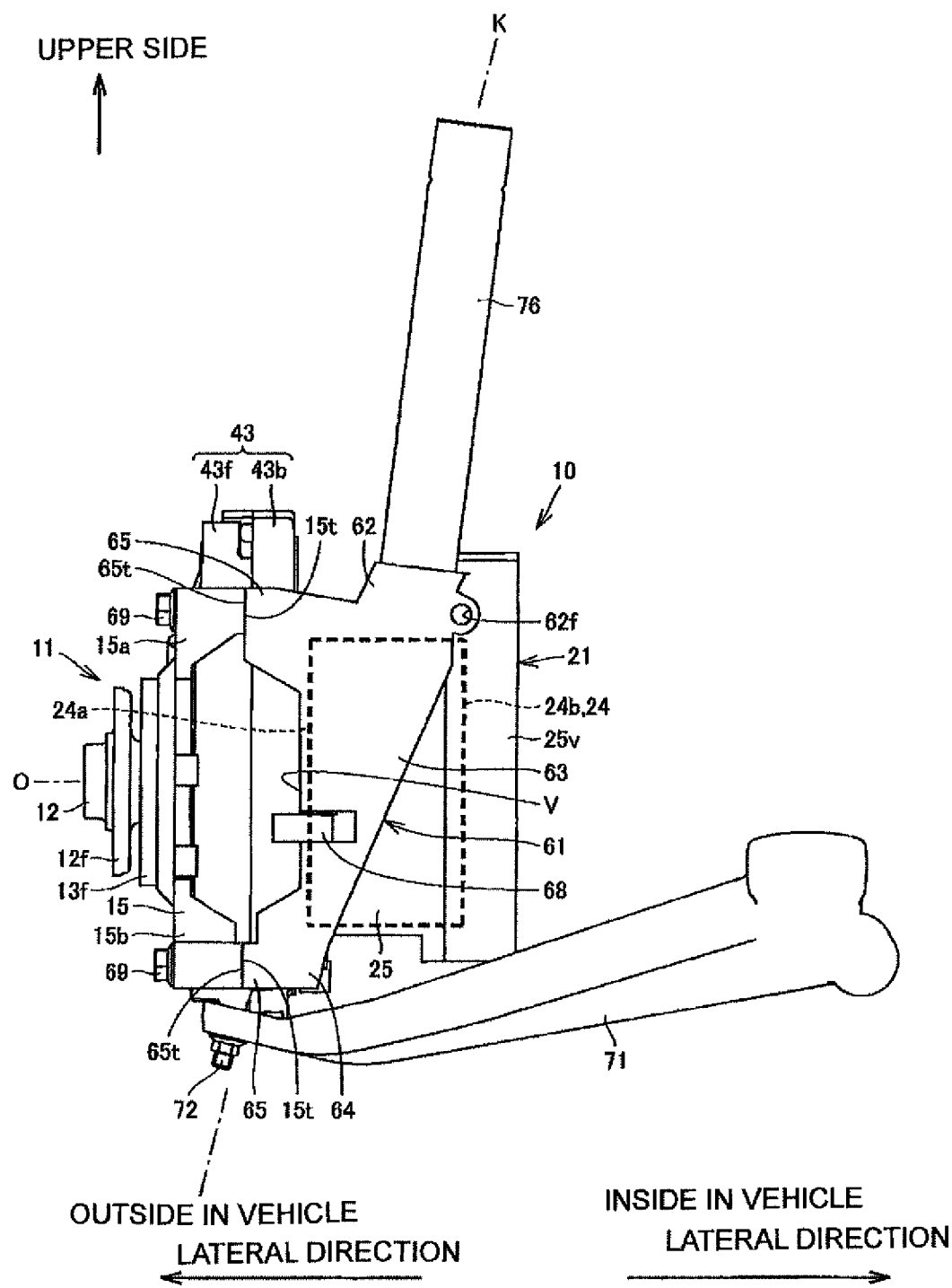
FIG. 2 is a side view illustrating the same embodiment together with the suspension device.
Figure 3:
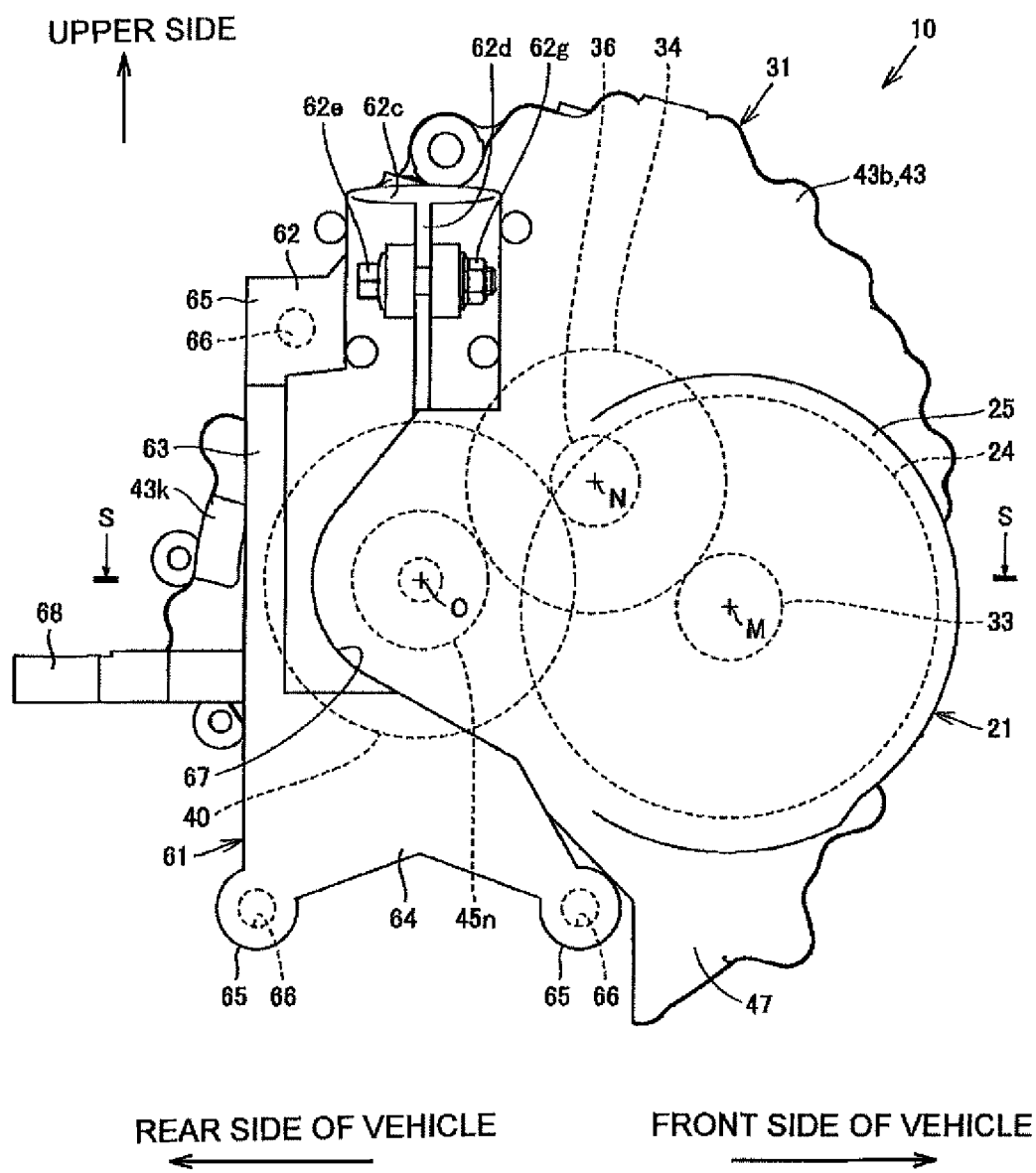
FIG. 3 is a back view schematically illustrating the same embodiment.
Figure 4:
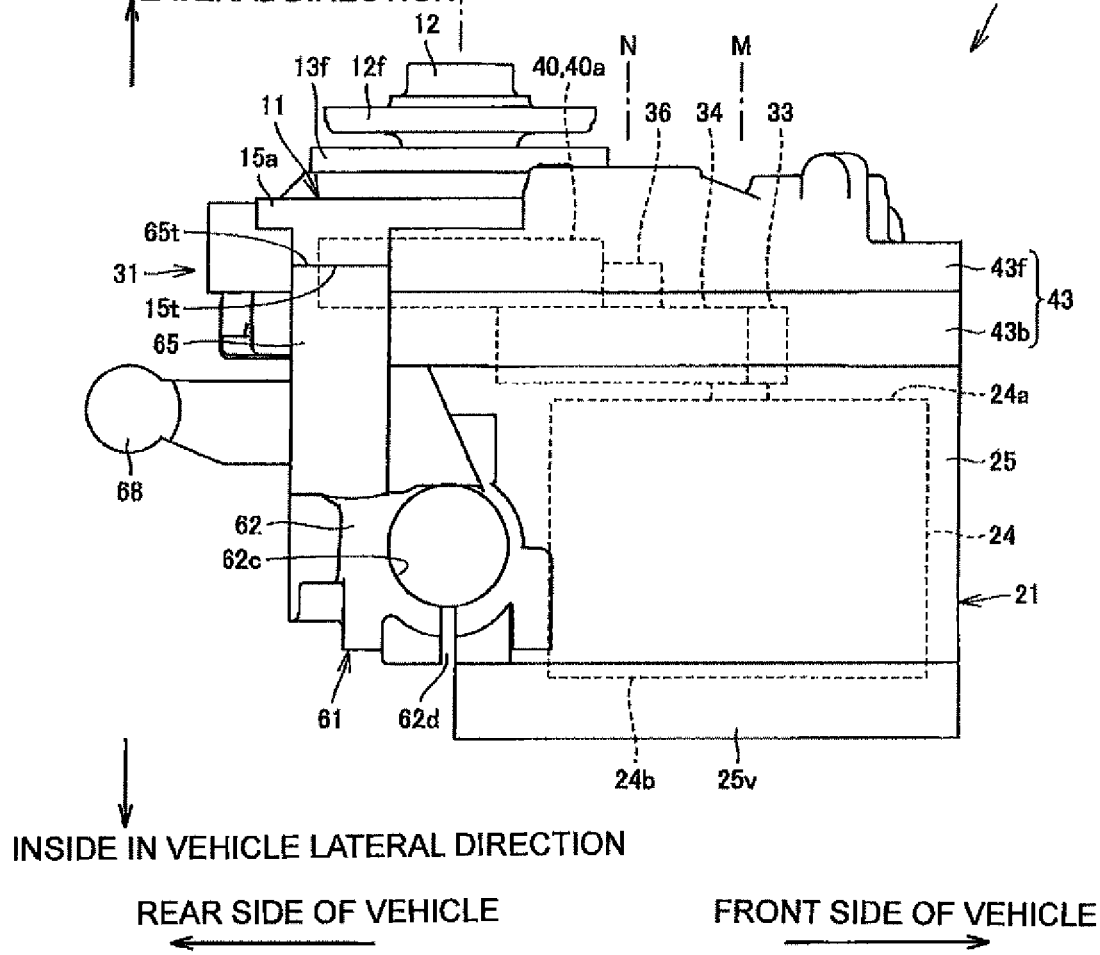
FIG. 4 is a plan view schematically illustrating the same embodiment.

Embodiments of the present invention will be described in detail below with reference to the drawings. FIG. 1 is a front view illustrating an in-wheel motor drive device according to an embodiment of the present invention together with a suspension device, and illustrates a state viewed from the outside in a lateral direction of a vehicle. FIG. 2 is a side view illustrating the same embodiment together with the suspension device, and illustrates a state viewed from the rear side of the vehicle. FIG. 3 is a back view schematically illustrating the same embodiment and illustrates a state viewed from the inside in the vehicle lateral direction. FIG. 4 is a plan view schematically illustrating the same embodiment and illustrates a state as viewed from the upper side. An in-wheel motor drive device 10 includes: a wheel hub bearing unit 11, which is arranged symmetrically on both left and right sides of an electric vehicle (not illustrated) in the vehicle lateral direction, is arranged in a hollow area of a wheel (not illustrated), and is provided at the center of the wheel (not illustrated); a motor unit 21 that drives the wheel; and a speed reduction unit 31 that decelerates rotation of the motor unit and transmits the decelerated rotation to the wheel hub bearing unit 11. At this time, the wheel hub bearing unit 11 is arranged on the outside in the vehicle lateral direction, the motor unit 21 is arranged on the inside in the vehicle lateral direction, and the speed reduction unit 31 is arranged at the center portion in the vehicle lateral direction as illustrated in FIG. 4. In addition, the motor unit 21 and the speed reduction unit 31 are arranged so as to be offset from an axis O of the wheel hub bearing unit 11 in a perpendicular direction as illustrated in FIG. 1. The axis O is an axis extending in the vehicle lateral direction.

Figure 5:
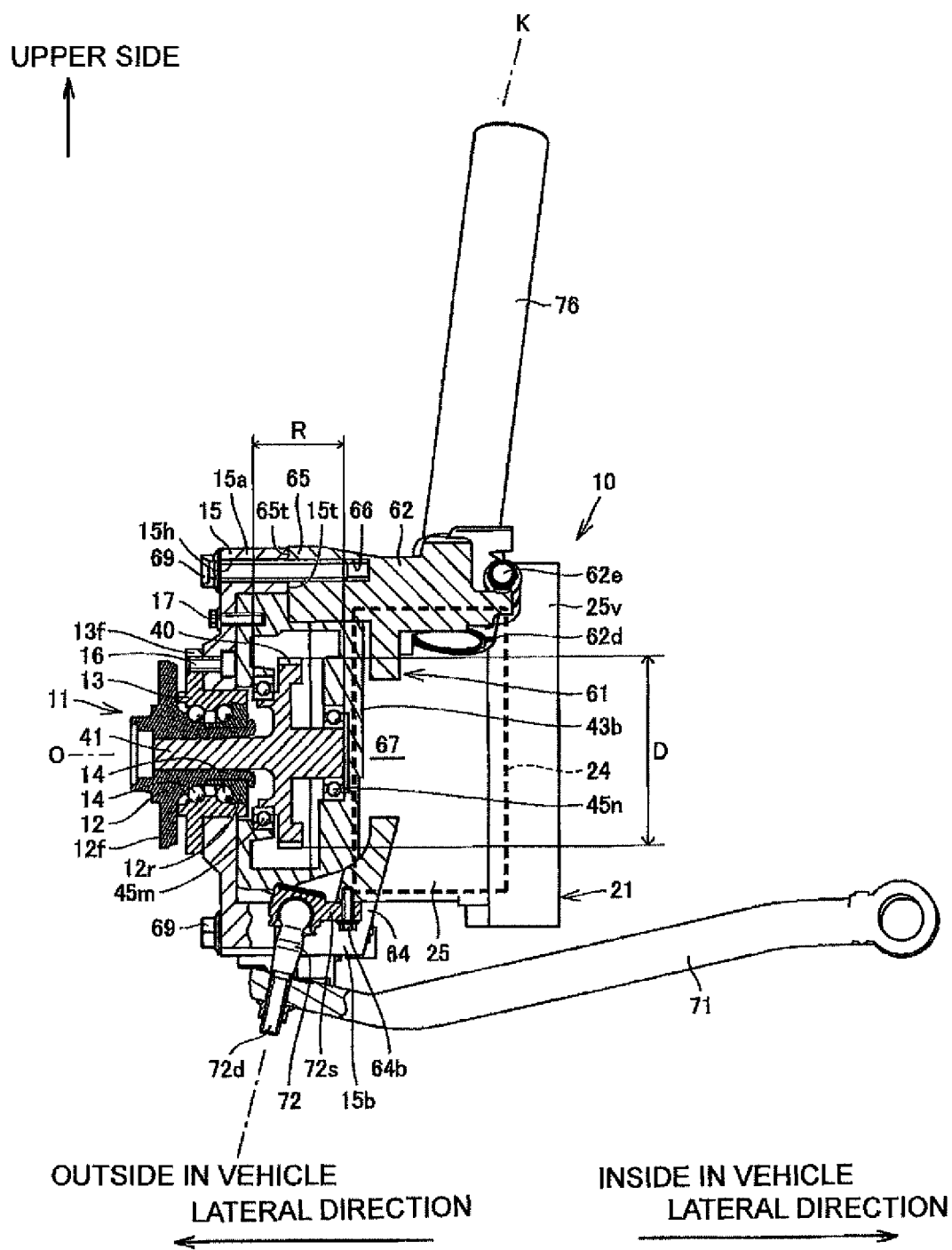
FIG. 5 is a cross-sectional view illustrating the same embodiment.

FIG. 5 is a cross-sectional view illustrating a state where a cross section of the in-wheel motor drive device, cut along two planes indicated by B-O-B in FIG. 1, is viewed in the arrow direction, and illustrates the inside of the wheel hub bearing unit. The wheel hub bearing unit 11 has an inner ring 12 as a hub ring coupled with a road wheel (not illustrated) and an annular outer ring 13 arranged coaxially on the outer diameter side of the inner ring 12, which constitute the rotating inner ring and the fixed outer ring, and a plurality of rolling elements 14 arranged in an annular gap between the inner ring 12 and the outer ring 13. The inner ring 12 passes through a center hole of the outer ring 13 and extends along the axis O, and one end in the direction of the axis O of the inner ring 12 protrudes from the outer ring 13 and is directed to the outside in the vehicle lateral direction. A large-diameter flange portion 12f is formed at the one end in the direction of the axis O of the inner ring 12. A road wheel (not illustrated) is coaxially attached to the flange portion 12f.

The other side in the direction of the axis O of the inner ring 12 is directed to the inside in the vehicle lateral direction and an annular inner bearing ring 12r is fitted to an outer circumference of the other side in the direction of the axis O. In the following description, one side in the direction of the axis O means the outside in the vehicle lateral direction (outboard side), and the other side in the direction of the axis O means the inside in the vehicle lateral direction (inboard side).

The rolling elements 14 are arranged in a plurality of rows to be separated in the direction of the axis O. An outer circumferential surface of a central portion in the direction of the axis O of the inner ring 12 forms an inner raceway surface of the rolling element 14 in a first row and opposes an inner circumferential surface at one end in the direction of the axis O of the outer ring 13. An outer circumferential surface of the inner bearing ring 12r forms an inner raceway surface of the rolling element 14 in a second row and opposes an inner circumferential surface at the other end in the direction of the axis O of the outer ring 13. The inner circumferential surface of the outer ring 13 forms an outer raceway surface of the rolling element 14.

A flange portion 13f is formed on the outer ring 13. A hub attachment 15 is attached and fixed to the flange portion 13f using bolts 16. The hub attachment 15 is a plate material having a through-hole to receive the outer ring 13 at the center, and serves to expand the outer ring 13 to the outer diameter side. The bolt 16 is inserted into a round hole formed in the hub attachment 15 from the inside in the direction of the axis O and is screwed into a female screw hole formed in the flange portion 13f. In addition, the bolts 16 are arranged at equal intervals in the circumferential direction about the axis O.

The outer ring 13 has a circular shape. On the other hand, the hub attachment 15 is a plate-shaped member that includes an annular circular part 15c to receive the outer ring 13, an upper part 15a projecting upward from the circular part 15c, and a lower part 15b projecting downward from the circular part 15c as illustrated in FIG. 1. As illustrated in FIG. 5, a main body casing 43, which will be described later, is attached and fixed to the circular part 15c using a bolt 17. The upper part 15a is, for example, a triangular shape with a tapered upper end. The lower part 15b is, for example, a rectangular. A female screw hole, configured for connection with the main body casing 43 and a suspension bracket 61, which will be described later, is drilled in the hub attachment 15. The respective members of the wheel hub bearing unit 11 described so far are made of steel.

Figure 6:
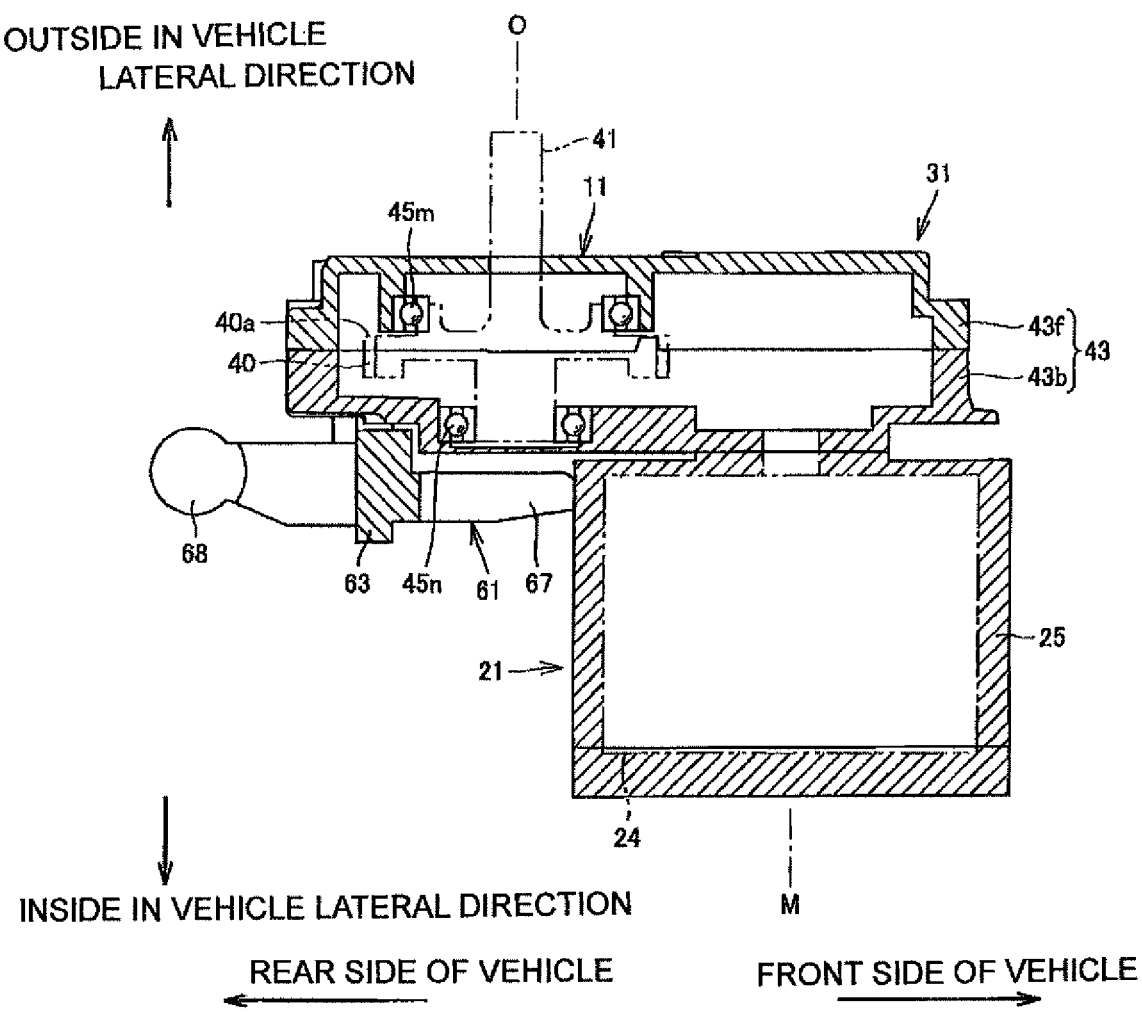
FIG. 6 is a cross-sectional view illustrating the same embodiment.
Figure 7:
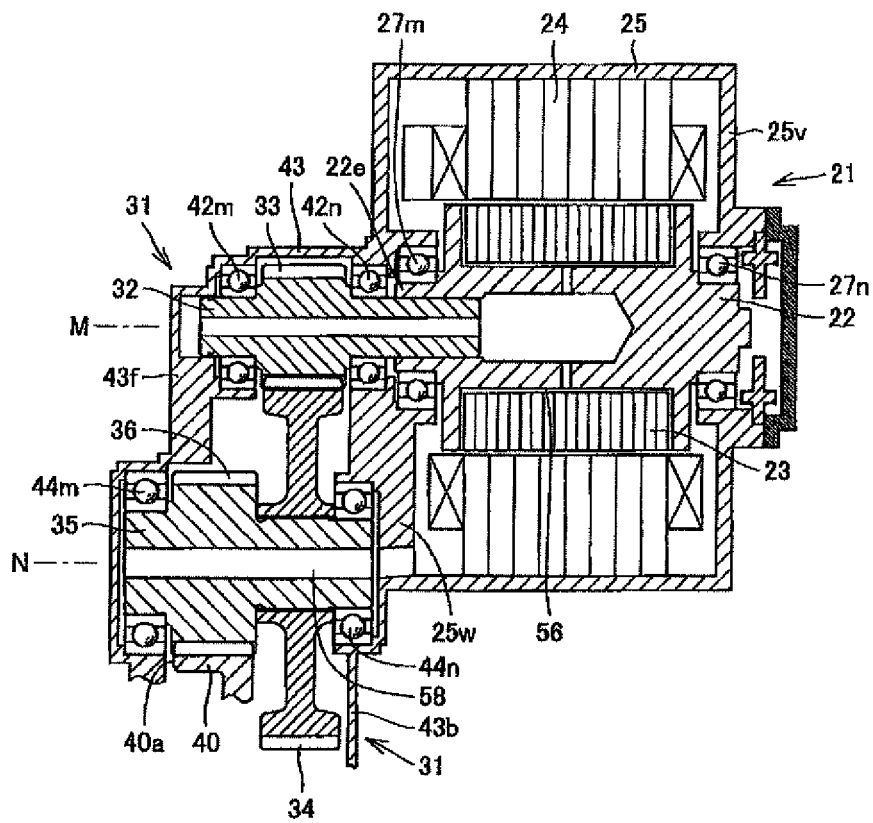
FIG. 7 is an exploded cross-sectional view illustrating a motor unit and a speed reduction unit of the same embodiment.

FIGS. 3 and 4 illustrate an axis M of the motor unit 21, a stator 24, and a motor casing 25. FIG. 6 is a cross-sectional view illustrating a state where a cross section of the in-wheel motor drive device, cut along a plane indicated by S-S in FIG. 3, is viewed in the arrow direction, and illustrates a positional relationship between the wheel hub bearing unit 11 and the motor unit 21. FIG. 7 is an exploded cross-sectional view illustrating the motor unit 21 and the speed reduction unit 31, and illustrates a cross section of the in-wheel motor drive device cut along a plane including the axis M and an axis N to be described later, and a plane including the axis N and the axis O.

The motor unit 21 has a motor rotary shaft 22, a rotor 23, the stator 24, and the motor casing 25, and these members are sequentially arranged from the axis M of the motor unit 21 to the outer diameter side in this order. The motor rotary shaft 22 and the rotor 23 extend along the axis M. In FIG. 3, an outer diameter of a stator core of the stator 24 is indicated by the broken line. As illustrated in FIG. 4, the motor casing 25 protrudes to the inside in the vehicle lateral direction from the main body casing 43.

The motor unit 21 is a radial gap motor in a form of an inner rotor and an outer stator, but may be of another form. For example, the motor unit 21 may be an axial gap motor although not illustrated.

The axis M that is a rotation center of the motor rotary shaft 22 and the rotor 23 extends in parallel with the axis O of the wheel hub bearing unit 11. That is, the motor unit 21 is arranged so as to be offset away from the axis O of the wheel hub bearing unit 11. As illustrated in FIG. 5, the motor unit 21 is arranged on the inside in the vehicle lateral direction of the wheel hub bearing unit 11, and a position of the stator 24 in the direction of the axis O does not overlap with positions of the outer ring 13 and the hub attachment 15 in the direction of the axis O. The motor casing 25 has a substantially cylindrical shape, is coupled to a back part 43b of the main body casing 43 at one end in the direction of the axis M, and is sealed in a cup-shaped motor casing cover 25v (FIG. 4) at the other end in the direction of the axis M. The motor unit 21 drives the inner ring 12.

The speed reduction unit 31 has an input shaft 32, an input gear 33, an intermediate gear 34, an intermediate shaft 35, an intermediate gear 36, an output gear 40, an output shaft 41, and the main body casing 43. As illustrated in FIG. 7, the input shaft 32 is a shaft body having a smaller diameter than a distal end 22e of the motor rotary shaft 22, and extends along the axis M of the motor unit 21. The input shaft 32 is inserted into a center hole of the distal end 22e and fitted coaxially. Both ends of the input shaft 32 are supported by the main body casing 43 via rolling bearings 42m and 42n. Specifically, one end in the direction of the axis M of the input shaft 32 is supported by a front part 43f via the rolling bearing 42m, and the other end in the direction of the axis M of the input shaft 32 is supported by the back part 43b via the rolling bearing 42n. The input gear 33 is an externally toothed gear having a smaller diameter than the motor unit 21, and is coupled coaxially with the input shaft 32. Specifically, the input gear 33 is integrally formed on an outer circumference of a central portion in the direction of the axis M of the input shaft 32.

As illustrated in FIG. 5, the output shaft 41 is a shaft having a smaller diameter than the inner ring 12, is coupled coaxially with the output gear 40, and extends along the axis O of the wheel hub bearing unit 11. The inner ring 12 has a cylindrical shape, and one end in the direction of the axis O of the output shaft 41 is inserted into a center hole at the other end in the direction of the axis O of the inner ring 12 so that the output shaft 41 is coupled coaxially with the inner ring 12. Specifically, for example, a spline groove is formed on an outer circumferential surface of the output shaft 41, a spline groove is formed on an inner circumferential surface of the other end in the direction of the axis O of the inner ring 12, and these spline grooves are spline-fitted. Such spline-fitting realizes torque transmission between the output shaft 41 and the inner ring 12 and allows relative movement therebetween. The output gear 40 is an externally toothed gear. For example, the motor unit 21 may be an axial gap motor although not illustrated.

The axis M that is a rotation center of the motor rotary shaft 22 and the rotor 23 extends in parallel with the axis O of the wheel hub bearing unit 11. That is, the motor unit 21 is arranged so as to be offset away from the axis O of the wheel hub bearing unit 11. In addition, an axial position of the motor unit 21 does not overlap with the position of the outer ring 13 in the direction of the axis O as illustrated in FIG. 5. The motor casing 25 has the substantially cylindrical shape, is coupled to the back part 43*b* of the main body casing 43 at one end in the direction of the axis M, and is sealed in the cup-shaped motor casing cover 25*v* at the other end in the direction of the axis M. Both ends of the motor rotary shaft 22 are rotatably supported by the motor casing 25 and rolling bearings 27 and 28. The motor unit 21 drives the inner ring 12.

The speed reduction unit 31 has the input shaft 32, the input gear 33, the intermediate gear 34, the intermediate shaft 35, the intermediate gear 36, the output gear 40, the output shaft 41, and the main body casing 43. The input shaft 32 is a tubular body having a smaller diameter than the distal end 22*e* of the motor rotary shaft 22, and extends along the axis M of the motor unit 21. The distal end 22*e* is received by the center hole at the other end of the input shaft 32 in the direction of the axis M, and the input shaft 32 is coupled coaxially with the motor rotary shaft 22. Both the ends of the input shaft 32 are supported by the main body casing 43 via the rolling bearings 42*m* and 42*n*. Specifically, one end in the direction of the axis M of the input shaft 32 is supported by the front part 43*f* via the rolling bearing 42*m*, and the other end in the direction of the axis M of the input shaft 32 is supported by the back part 43*b* via the rolling bearing 42*n*. The input gear 33 is an externally toothed gear having a smaller diameter than the motor unit 21, and is coupled coaxially with the input shaft 32. Specifically, the input gear 33 is integrally formed on an outer circumference of a central portion in the direction of the axis M of the input shaft 32.

The output shaft 41 is the shaft having a smaller diameter than the inner ring 12, is coupled coaxially with the output gear 40 as the externally toothed gear, and extends along the axis O of the wheel hub bearing unit 11. The inner ring 12 has the cylindrical shape, and one end in the direction of the axis O of the output shaft 41 is inserted into the center hole at the other end in the direction of the axis O of the inner ring 12 so that the output shaft 41 is coupled coaxially with the inner ring 12. Specifically, for example, the spline groove is formed on the outer circumferential surface of the output shaft 41, the spline groove is formed on the inner circumferential surface of the other end in the direction of the axis O of the inner ring 12, and these spline grooves are spline-fitted. Such spline-fitting realizes torque transmission between the output shaft 41 and the inner ring 12 and allows relative movement therebetween.

The output gear 40 is the externally toothed gear, and is coupled coaxially with the output shaft 41. Specifically, the output gear 40 is integrally formed on an outer circumference of a central portion in the direction of the axis O of the output shaft 41. The output shaft 41 is supported at both ends by the main body casing 43 via rolling bearings 45*m* and 45*n*. Specifically, the center portion in the direction of the axis O of the output shaft 41 is supported by the front part 43*f* via the rolling bearing 45*m*, and the other end in the direction of the axis O of the output shaft 41 is supported by the back part 43*b* via the rolling bearing 45*n*. The output gear 40 is provided between the rolling bearings 45*m* and 45*n*.

The intermediate shaft 35 extends in parallel with the input shaft 32 and the output shaft 41. That is, the speed reduction unit 31 is a three-axis parallel shaft gear speed reducer, and the axis O of the output shaft 41, the axis N of the intermediate shaft 35, and the axis M of the input shaft 32 extend in parallel with each other, in other words, extend in the vehicle lateral direction.

The intermediate gear 34 and the intermediate gear 36 are externally toothed gears and are coupled coaxially with a central area in the direction of the axis N of the intermediate shaft 35 as illustrated in FIG. 7. Both ends of the intermediate shaft 35 are supported by the main body casing 43 via rolling bearings 44*m* and 44*n*. Specifically, one end in the direction of the axis N of the intermediate shaft 35 is supported by the front part 43*f* via the rolling bearing 44*m*, and the other end in the direction of the axis N of the intermediate shaft 35 is supported by the back part 43*b* via the rolling bearing 44*n*.

The small-diameter input gear 33 and the large-diameter intermediate gear 34 are arranged on the other side in the axial direction of the speed reduction unit 31 (on the side of the motor unit 21) to mesh with each other. The small-diameter intermediate gear 36 and the large-diameter output gear 40 are arranged on one side in the axial direction of the speed reduction unit 31 (the side of the flange portion 120 to mesh with each other. In this manner, the input gear 33, the plurality of intermediate gears 34 and 36 and the output gear 40 mesh with each other to form a drive transmission path from the input gear 33 through the plurality of intermediate gears 34 and 36 to the output gear 40. Then, with the above-described meshing of the driving-side small-diameter gear and the driven-side large-diameter gear, the rotation of the input shaft 32 is decelerated by the intermediate shaft 35, and the rotation of the intermediate shaft 35 is decelerated by the output shaft 41. As a result, the speed reduction unit 31 secures a sufficient speed reduction ratio. Among the plurality of intermediate gears, the intermediate gear 34 is the first intermediate gear located on an input side of the drive transmission path.

Among the plurality of intermediate gears, the intermediate gear 36 is the last intermediate gear located on an output side of the drive transmission path.

The main body casing 43 forms an outer shell of the speed reduction unit 31 and the wheel hub bearing unit 11, is formed in a cylindrical shape, and surrounds the axes O, N, and M extending parallel with each other as illustrated in FIG. 1. In addition, the main body casing 43 is accommodated in a hollow area of the road wheel (not illustrated). Further, one axial areas of the wheel hub bearing unit 11, the speed reduction unit 31, and the motor unit 21 are accommodated in the hollow area of the road wheel. In addition, the other axial area of the motor unit 21 protrudes from the road wheel to the other side in the axial direction. In this manner, the road wheel accommodates most of the in-wheel motor drive device 10.

Referring to FIG. 1, the main body casing 43 protrudes downward at a position separated in the vehicle longitudinal direction from the axis O of the output gear 40, more specifically, immediately below the axis M of the input gear 33. This protruding portion forms an oil tank 47. On the other hand, a space is secured between a portion of the main body casing 43 immediately below the axis O and a lower portion of a rim of the road wheel. As illustrated in FIG. 2, an outer end in the vehicle lateral direction of a lower arm 71 is arranged in this space.

The cylindrical main body casing 43 further accommodates the input shaft 32, the input gear 33, the intermediate gear 34, the intermediate shaft 35, the intermediate gear 36, the output gear 40, and the output shaft 41 (each gear is illustrated in FIG. 3). The inside of the main body casing 43 is filled with the lubricating oil. The input gear 33, the intermediate gear 34, the intermediate gear 36, and the output gear 40 are helical gears, the above-described various rolling bearings are ball bearings, and these members are lubricated and cooled by the lubricating oil.

The main body casing 43 includes the front part 43f which is substantially flat and covers one side in the axial direction of a cylindrical part of the speed reduction unit 31 and the back part 43b which is substantially flat and covers the other side in the axial direction of the cylindrical part of the speed reduction unit 31 as illustrated in FIG. 4. The back part 43b is coupled with the motor casing 25. In addition, the back part 43b is coupled with a suspension member (the lower arm 71 and a strut 76 in the present embodiment) such as an arm and a damper via the suspension bracket 61 to be described later. As a result, the in-wheel motor drive device 10 is connected to the suspension device. Incidentally, the arm, the damper, and the like of the suspension device are attached on a vehicle body side as viewed from a member to be described, here, the in-wheel motor drive device 10, and thus, are also referred to as vehicle-body-side members. The main body casing 43, the motor casing 25, and the motor casing cover 25v are connected to the vehicle-body-side members via the suspension bracket, and thus, are separated from the vehicle-body-side members.

Next, the suspension bracket of the in-wheel motor drive device will be described.

Figure 8:
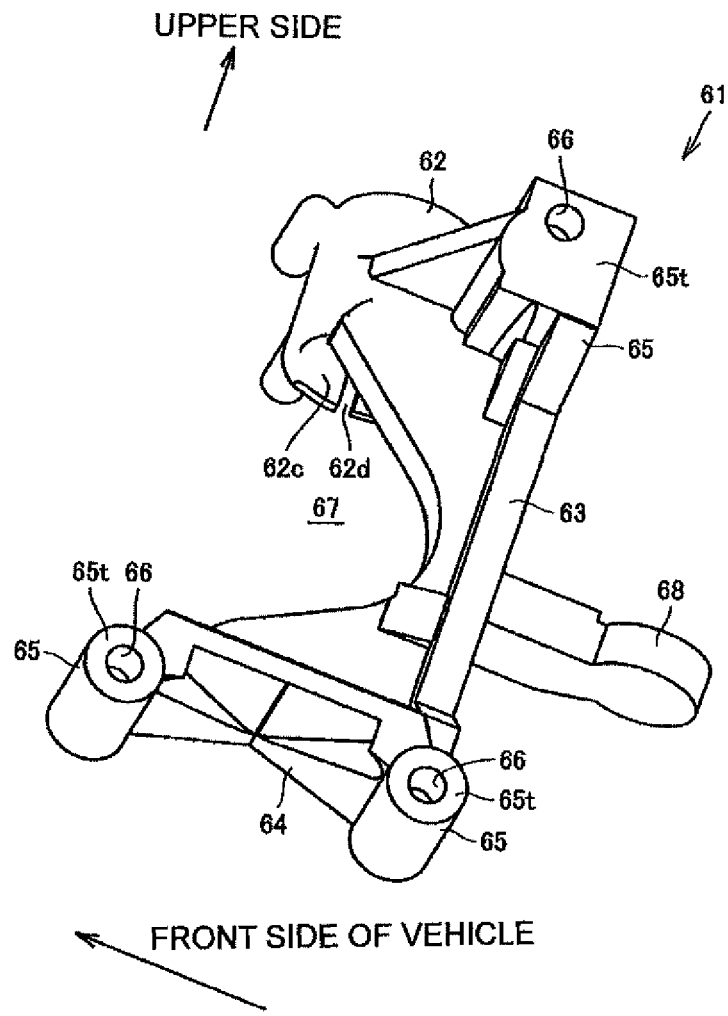
FIG. 8 is a perspective view illustrating a suspension bracket detached from the same embodiment.

FIG. 8 is a perspective view illustrating the suspension bracket detached from the in-wheel motor drive device according to one embodiment of the present invention, and mainly illustrates the outside in the vehicle lateral direction. As illustrated in FIGS. 2 to 4, the suspension bracket 61 is attached to the main body casing 43 and the hub attachment 15 of the present embodiment. The hub attachment 15, the speed reduction unit 31, and the suspension bracket 61 are arranged in this order with respect to positions in the direction of the axis O. In addition, the position of the suspension bracket 61 in the direction of the axis O overlaps with the position of the motor unit 21 in the direction of the axis O. With respect to positions in the vehicle longitudinal direction, the motor unit 21 and the speed reduction unit 31 are arranged on the front side, and the wheel hub bearing unit 11 and the suspension bracket 61 are arranged on the rear side.

As illustrated in FIG. 8, the suspension bracket 61 is a member including an upper connecting seat portion 62, an intermediate area 63, a lower connecting seat portion 64, and a protruding portion 65. The upper connecting seat portion 62 is provided at an upper end of the suspension bracket 61 and is connected to a lower end of an upper suspension member, for example, the strut 76 illustrated in FIG. 2. The upper connecting seat portion 62 is provided with a through-hole 62c extending in the vertical direction, a slit 62d dividing a part of the through-hole 62c in the circumferential direction, through-holes 62f (FIG. 2) provided to oppose each other with the slit 62d therebetween, and a bolt 62e and a nut 62g (FIG. 3) which pass through the through-holes 62f to be installed to the slit 62d, and the through-hole 62c has a C-shaped cross section. When the strut 76 is inserted into the through-hole 62c and the bolt 62e and the nut 62g are tightened, the slit 62d is narrowed to fix the strut 76.

The strut 76 is a shock absorber that forms the upper suspension member of the strut-type suspension device and includes a damper extending in the vertical direction and a coil spring attached to the damper. Incidentally, each of the drawings illustrates only an outer cylinder of the damper of the strut 76 and does not illustrate an inner cylinder of the damper, the coil spring, a coil spring seat, and the like.

The lower connecting seat portion 64 is provided at a lower end of the suspension bracket 61 and is connected to an outer end in the vehicle lateral direction of a lower suspension member, for example, the lower arm 71. As illustrated in FIG. 5, a socket 72s of a ball joint 72 is attached to the lower connecting seat portion 64 of the suspension bracket 61 using a bolt 64b. The socket 72s is a downward opening. A ball stud 72d of the ball joint 72 is erected on the lower arm 71. The ball stud 72d is nut-fixed to the outer end in the vehicle lateral direction of the lower arm 71 at a lower end and has a ball portion at an upper end. The ball portion of the ball stud 72d is slidably accommodated in the socket 72s. As a result, the ball stud 72d is freely connected to the socket 72s.

The lower arm 71 is an arm forming the lower suspension member of the strut-type suspension device. The lower arm 71 extends in the vehicle lateral direction, is rotatably connected to the vehicle-body-side member such as a subframe at an inner end in the vehicle lateral direction, and can swing in the vertical direction with the inner end in the vehicle lateral direction as a base end and an outer end in the vehicle lateral direction as a free end.

As illustrated in FIG. 8, the intermediate area 63 occupies a central area in the vertical direction of the suspension bracket 61 and connects the upper connecting seat portion 62 and the lower connecting seat portion 64. The intermediate area 63 connects a rear side of the vehicle of the upper connecting seat portion 62 and a rear side of the vehicle of the lower connecting seat portion 64. Further, a notch 67 is defined between a front side of the vehicle of the upper connecting seat portion 62 and a front side of the vehicle of the lower connecting seat portion 64. The notch 67 is arranged so as not to overlap with the entire rolling bearing 45n as viewed in the direction of the axis O as illustrated in FIG. 3. In FIG. 3, a pitch circle of a rolling element of the rolling bearing 45n is indicated by the broken line. As a result, the notch 67 can be secured as a space as illustrated in FIG. 5. Incidentally, the vehicle longitudinal direction is also the horizontal direction.

A plurality of the protruding portions 65 is provided on the suspension bracket 61 which is a single member, and there are the protruding portion 65 protruding horizontally to the outside in the vehicle lateral direction from the upper connecting seat portion 62 and the protruding portion 65 protruding horizontally to the outside in the vehicle lateral direction from the lower connecting seat portion 64 as illustrated in FIG. 8. In the present embodiment, the single protruding portion 65 is formed on the upper side. In addition, the two protruding portions 65 are formed on the lower side with an interval in the vehicle longitudinal direction. The upper connecting seat portion 62, the intermediate area 63, the lower connecting seat portion 64, and the protruding portion 65 are integrally formed.

As illustrated in FIG. 2, each of the protruding portions 65 is in contact with the hub attachment 15.

Specifically, a butt surface 65t formed at a distal end of the protruding portion 65 on the upper side is brought into contact with a butt surface 15t formed to protrude to the inside in the vehicle lateral direction from the upper part 15a of the hub attachment 15. In addition, the butt surfaces 65t formed at distal ends of the protruding portions 65 on the lower side are brought into contact with the butt surfaces 15t of the lower part 15b of the hub attachment 15. In this manner, the butt surface 65t of each of the protruding portions 65 is brought into contact with the other surface in the direction of the axis O of the hub attachment 15 at a position not interfering with the main body casing 43.

As illustrated in FIG. 5, a female screw hole 66 is formed in each of the protruding portions 65 of the suspension bracket 61. Each of the female screw holes 66 is drilled in the butt surface 65t to extend in parallel with the axis O. A plurality of through-holes 15h as round holes is formed at a position corresponding to each of the female screw holes 66 in the hub attachment 15. Each of the through-holes 15h is drilled in the butt surface 15t to extend in parallel with the axis O. The butt surfaces 15t are provided at three locations so as to be separated from each other, but all the butt surfaces 15t flush with each other. Each of the butt surfaces 65t has the same configuration. The butt surfaces 15t and 65t in contact with each other are arranged in a range R from the rolling bearing 45m to the rolling bearing 45n. Incidentally, the range R includes own dimensions of the rolling bearings 45m and 45n in the direction of the axis O.

As illustrated in FIG. 2, the intermediate area 63 of the suspension bracket 61 overlaps with a steering axis K as viewed in the vehicle longitudinal direction. The vehicle longitudinal direction herein is orthogonal to the axis O.

As illustrated in FIG. 5, the suspension bracket 61 does not intersect the axis O at a section including the axis O. That is, the axis O passes through the notch 67 as illustrated in FIG. 3.

In FIG. 2, the stator core of the stator 24 is indicated by the broken line. The stator core is a stacked steel plate stacked in the axial direction of the motor unit 21. One axial end face 24a of the stator core is oriented to the outside in the vehicle lateral direction (outboard side), and the other axial end face 24b of the stator core is oriented to the inside in the vehicle lateral direction (inboard side).

The stator core is a stacked steel plate in which thin plates are stacked in the axial direction.

As illustrated in FIG. 2, the suspension bracket 61 overlaps with the stator 24 as viewed in the vehicle longitudinal direction. In other words, the position of the suspension bracket 61 in the direction of the axis O overlaps with a position of the stator 24 in the direction of the axis O. In addition, the upper connecting seat portion 62 protrudes upward from the stator 24, and the lower connecting seat portion 64 protrudes downward from the stator 24. In FIG. 4, one axial end 40a of a tooth width of the output gear 40 is indicated by the broken line. The suspension bracket 61 is arranged in a range from the one axial end 40a to the other axial end face 24b of the stator core with respect to the position in the direction of the axis O. As a result, the in-wheel motor drive device 10 is miniaturized in the direction of the axis O.

As illustrated in FIG. 5, the female screw hole 66 and the through-hole 15h coincide with each other, and bolts 69 pass through the respective through-holes 15h of the hub attachment 15 from one side in the direction of the axis O. Each of the bolts 69 passes through the through-hole 15h on one side in the direction of the axis O and is screwed with the female screw hole 66 on the other side in the direction of the axis O. The suspension bracket 61 is attached and fixed to the hub attachment 15 by tightening each of the bolts 69. In the present embodiment, the three bolts 69, the three through-holes 15h to receive the respective bolts 69, and the three female screw holes 66 to be screwed with the respective bolts 69 are provided as fixing means. However, the number of the bolts 69 or the like is not limited to such a predetermined number, and it is sufficient to arrange a plurality of the relevant members around the outer ring 13. In the present embodiment, the bolts 69 below the axis O are provided, respectively, on the front side of the vehicle and the rear side of the vehicle of the steering axis K as illustrated in FIG. 1. The female screw holes 66 and the butt surfaces 15t on the lower side also have the same configurations.

As illustrated in FIG. 5, the protruding portion 65 on the upper side is supported by the upper connecting seat portion 62 in a cantilever manner. The protruding portion 65 on the lower side is supported by the lower connecting seat portion 64 in a cantilever manner. A protruding part including the butt surface 15t is formed also in the hub attachment 15 at a position corresponding to each of the protruding portions 65. The protruding part is also supported by the hub attachment 15 in a cantilever manner. Since the protruding portions 65 extend like a tripod, the hub attachment 15 and the suspension bracket 61 define an opening V which is open in the vehicle longitudinal direction as illustrated in FIG. 2. The main body casing 43 is exposed from the opening V.

A dimension from an upper end of the upper connecting seat portion 62 to a lower end of the lower connecting seat portion 64, that is, a dimension of the suspension bracket 61 in the vertical direction is larger than a diameter D of an addendum circle of the output gear 40. The butt surfaces 15t and 65t, and the through-hole 15h, the female screw hole 66, and the bolt 69, which serve as the fixing means, are arranged on the outer diameter side of the output gear 40 with reference to FIG. 3. However, the suspension bracket 61 overlaps with the output gear 40 as viewed in the direction of the axis O as illustrated in FIG. 3. Similarly, the hub attachment 15 also overlaps with the output gear 40. Since the fixing means are arranged in this manner, connection rigidity between the suspension bracket 61 and the hub attachment 15 increases.

In addition, the female screw holes 66 serving as the fixing means are arranged in a polygon (a triangle in the present embodiment) as viewed in the direction of the axis O as illustrated in FIG. 3. The bolts 69 also have the same configuration. One part of the main body casing 43 is arranged so as to project to the front side of the vehicle from the polygon. Further, the other part 43k of the main body casing 43 is arranged so as to project to the rear side of the vehicle from the polygon. As a result, the main body casing 43 is reliably attached and fixed to the hub attachment 15 or the suspension bracket 61.

The suspension bracket 61 further includes a tie rod arm 68. The tie rod arm 68 is arranged at a rear portion of the vehicle in the intermediate area 63 and is integrally formed with the intermediate area 63. When the suspension bracket 61 is attached and fixed to an inner part in the vehicle lateral direction of the in-wheel motor drive device 10, the tie rod arm 68 extends to the rear side of the vehicle.

A tie rod connecting seat portion, such as a round hole to receive the ball joint, is formed at a distal end of the tie rod arm 68. A tie rod (not illustrated) is connected to the tie rod connecting seat portion at the distal end of the tie rod arm 68.

When the tie rod is pushed and pulled in the vehicle lateral direction by a steering device (not illustrated), the in-wheel motor drive device 10 including the suspension bracket 61 is steered together with the wheels. The steering axis K which is the center of steering is a straight line that passes through an upper end of the strut 76 and the center of the ball portion of the ball joint 72 and extends in the vertical direction as illustrated in FIG. 5.

The main body casing 43 is made of light metal and is, for example, a casting containing aluminum as the main component. In addition, the suspension bracket 61 and the hub attachment 15 are made of steel and have higher rigidity than the main body casing 43. In the present embodiment, the bolt 69, the through-hole 15h as the round hole, and the female screw hole 66 are provided as the fixing means. According to the present embodiment, the members that attach the in-wheel motor drive device 10 to the suspension device are concentrated in the suspension bracket 61. The suspension bracket 61 is attached and fixed to the hub attachment 15 of the wheel hub bearing unit 11. As a result, even if an excessive external force is applied from the wheel side to the wheel hub bearing unit 11, the suspension bracket 61 can accept the excessive external force to be released to the suspension device. Therefore, the excessive external force is not transmitted to the main body casing 43 of the speed reduction unit 31, and the speed reduction unit 31 can be protected such that an undesirable deformation does not occur in the speed reduction unit 31.

Incidentally, as a modified example (not illustrated), a brake caliper connecting seat portion may be provided on the suspension bracket 61 so that a brake caliper may be supported by the suspension bracket 61. According to such a modified example, even if a brake reaction force is applied from the brake caliper to the in-wheel motor drive device 10 during braking of the wheels, the suspension bracket 61 can accept the brake reaction force and return the force to the hub attachment 15. Therefore, the excessive brake reaction force is not transmitted to the main body casing 43 of the speed reduction unit 31, and the speed reduction unit 31 can be protected such that an undesirable deformation does not occur in the speed reduction unit 31.

Next, a suspension bracket according to another embodiment will be described.

Figure 9:
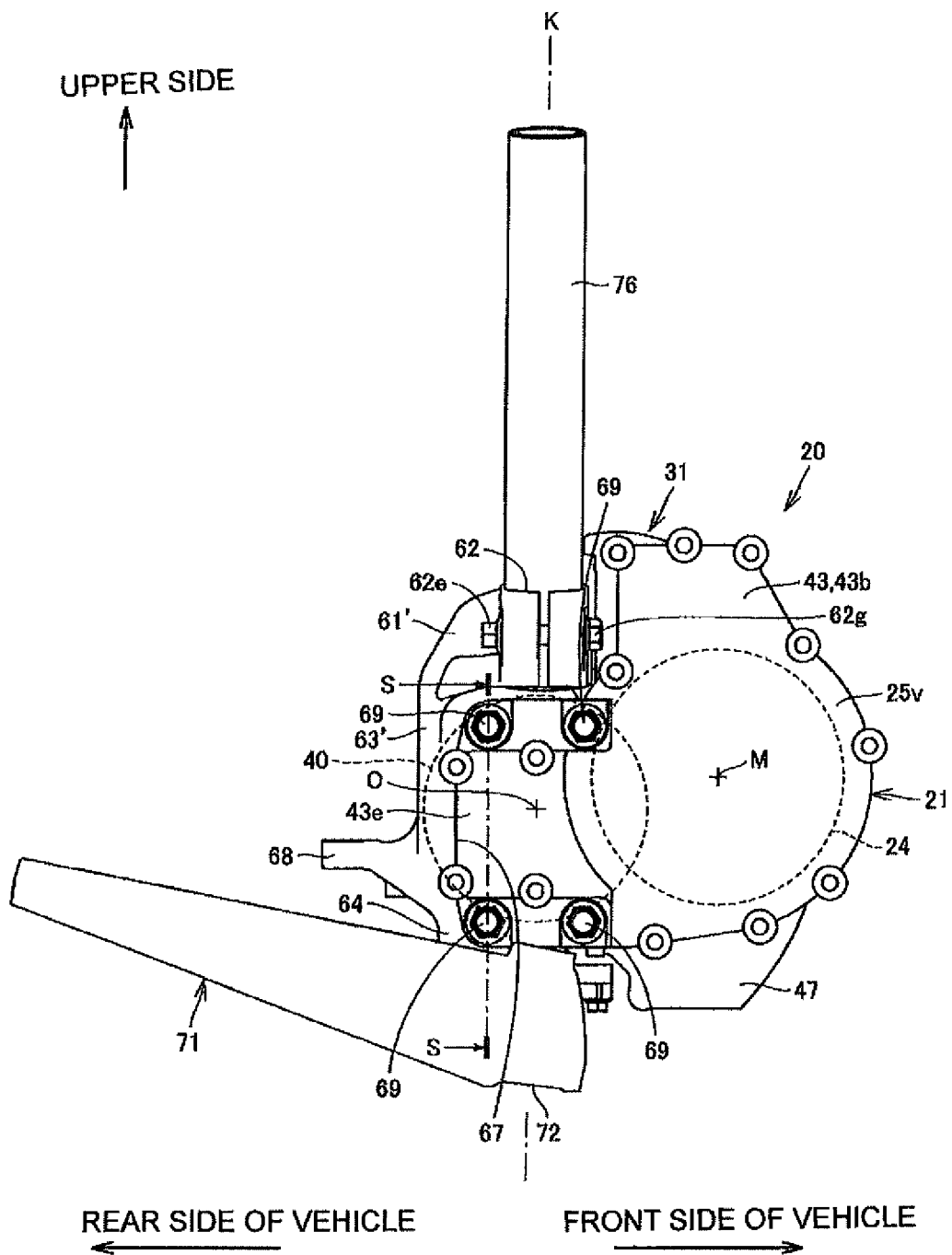
FIG. 9 is a back view illustrating an in-wheel motor drive device according to another embodiment of the present invention together with a suspension device.
Figure 10:
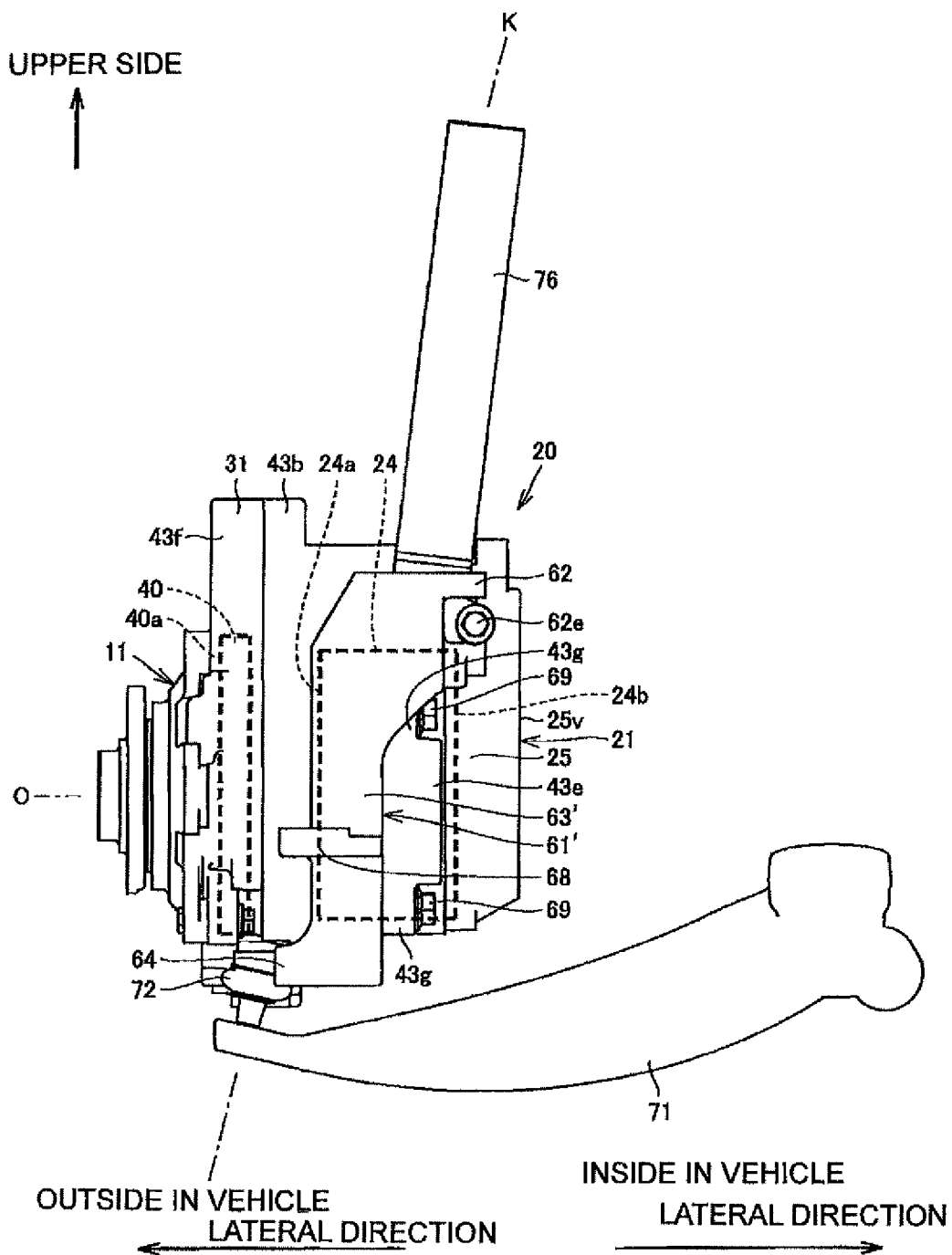
FIG. 10 is a side view illustrating the other embodiment together with the suspension device.
Figure 11:
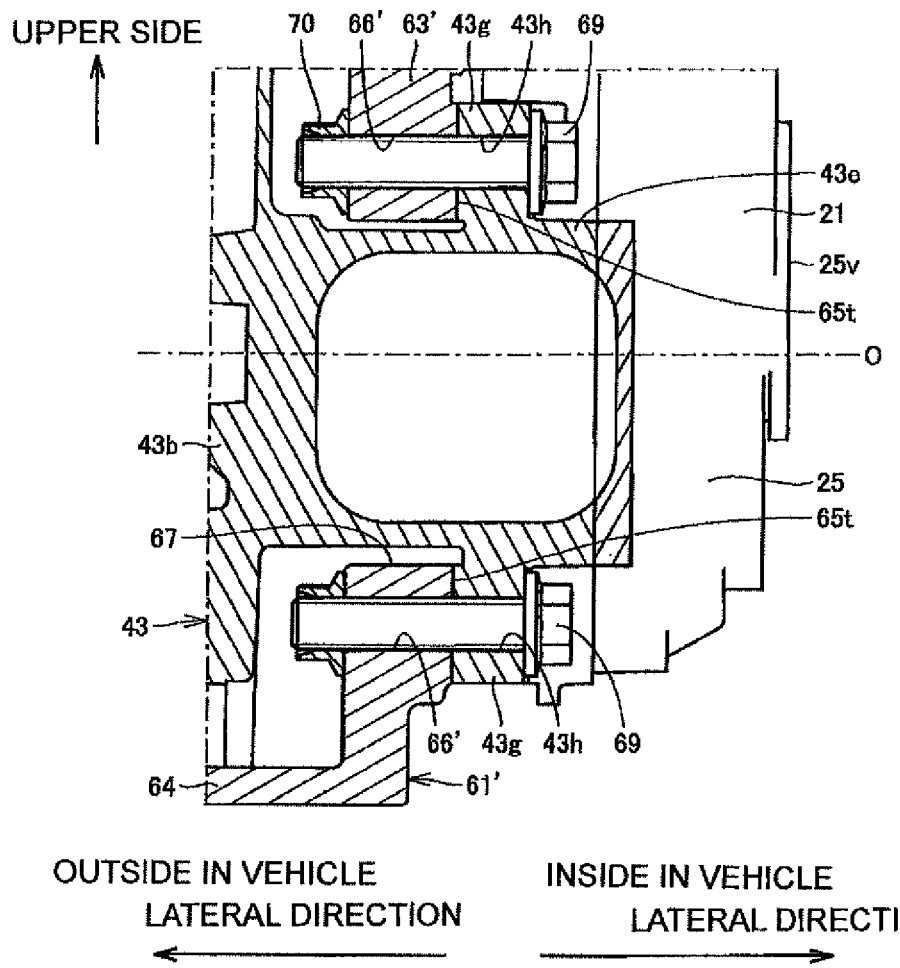
FIG. 11 is a cross-sectional view illustrating a fixing means of the other embodiment.
Figure 12:
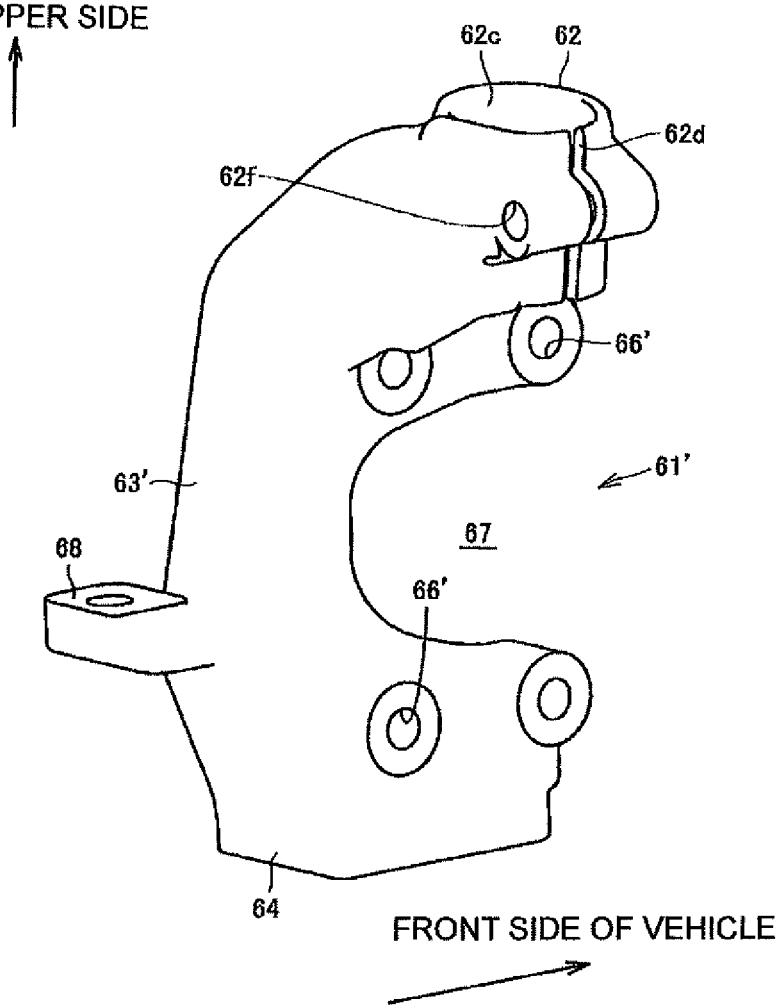
FIG. 12 is a perspective view illustrating a suspension bracket detached from the other embodiment.

FIG. 9 is a back view illustrating an in-wheel motor drive device 20 according to another embodiment of the present invention together with a suspension device, and illustrates a state viewed from the inside in the vehicle lateral direction. FIG. 10 is a side view illustrating the other embodiment together with the suspension device, and illustrates a state viewed from the rear side of the vehicle. FIG. 11 is a cross-sectional view illustrating a state where a cross section of the other embodiment, cut along a plane indicated by S-S in FIG. 9, is viewed in the arrow direction. FIG. 12 is a perspective view illustrating the suspension bracket detached from the other embodiment, and mainly illustrates the inside in the vehicle lateral direction. In the other embodiment, configurations common with those of the above-described embodiment will be denoted by the same reference signs and descriptions thereof will be omitted, and different configurations will be described below. In the other embodiment, a suspension bracket 61' is arranged to be separated from the wheel hub bearing unit 11 on the inside in the vehicle lateral direction as illustrated in FIG. 10, and is attached and fixed to the back part 43b of the main body casing 43.

An intermediate area 63' of the suspension bracket 61' occupies a center area in the vertical direction of the suspension bracket 61', extends in a plate shape, and connects the upper connecting seat portion 62 and the lower connecting seat portion 64. Incidentally, the upper connecting seat portion 62, the intermediate area 63', and the lower connecting seat portion 64 are integrally formed.

The intermediate area 63' is attached and fixed such that a plate-shaped surface thereof extends along a surface of the main body casing 43 on the other side in the direction of the axis O. In a straight traveling state of wheels (not illustrated), the axis O extends in the vehicle lateral direction. The plate-shaped intermediate area 63' has a through-hole 66' extending through a plate thickness and a notch 67 which is a concave portion formed so as to cut off an edge of a plate material. As illustrated in FIG. 12, the through-hole 66' is formed in each of an upper front portion, an upper rear portion, a lower front portion, and a lower rear portion of the intermediate area 63. The through-holes 66' are arranged two by two on the upper side and the lower side of the notch 67. As a modified example (not illustrated), one or more of each of the bolt 69 and the through-hole 66', which serve as fixing means for attaching and fixing the suspension bracket 61' to the main body casing 43, may be arranged on each of the upper side and the lower side of the notch 67. In FIG. 9, an addendum circle of the output gear 40 is indicated by the broken line. As illustrated in FIG. 9, the bolt 69 and the through-hole 66' are arranged so as to overlap with the output gear 40 as viewed in the direction of the axis O. Since the fixing means are arranged on an inner diameter side of the output gear 40 with respect to the axis O in this manner, connection rigidity between the suspension bracket 61' and the main body casing 43 increases.

The notch 67 is formed by cutting out a front edge of the intermediate area 63, and receives a convex portion 43e formed in the back part 43b of the main body casing 43. Thus, the intermediate area 63 is formed in a U-shape as a Japanese katakana or in a C-shape as an alphabet as viewed in the direction of the axis O. In other words, the suspension bracket 61' is formed in a substantially U-shape or substantially C-shape, and the U-shape or C-shape is open to the front side of the vehicle.

As illustrated in FIG. 11, protrusions 43g are formed, respectively, on upper and lower edges of the convex portion 43e. The protrusion 43g on the upper side protrudes upward, and the protrusion 43g on the lower side protrudes downward. A front surface of the protrusion 43g is oriented to the inside in the vehicle lateral direction. A back surface of the protrusion 43g is oriented to the outside in the vehicle lateral direction and opposes the back part 43b. Through-holes 43h corresponding to the respective through-holes 66' are formed in the respective protrusions 43g.

The bolts 69 are caused to pass through the respective through-holes 43h from the inside in the vehicle lateral direction. A shaft portion of each of the bolts 69 extends in parallel with the axis O and sequentially penetrates through the through-hole 43h and through-hole 66' to protrude from a back surface of the protrusion 43g. A distal end of the bolt 69 is screwed with a nut 70 in an external space of the main body casing 43. As the bolt 69 and the nut 70 are tightened, the protrusion 43g of the main body casing 43 and the intermediate area 63 of the suspension bracket 61' are clamped by a head portion of the bolt 69 and the nut 70. As a result, the suspension bracket 61' is reliably attached and fixed to the main body casing 43. Incidentally, the upper connecting seat portion 62 and the lower connecting seat portion 64 of the suspension bracket 61' are separated from the main body casing 43. Alternatively, the upper connecting seat portion 62 and/or the lower connecting seat portion 64 may be in contact with an outer wall surface of the main body casing 43 as a modified example.

As illustrated in FIG. 12, the intermediate area 63' is located on the rear side of the vehicle, the notch 67 is located on the front side of the vehicle, and thus, the notch 67 is open to the front side of the vehicle. Further, the intermediate area 63' is aligned between the protrusion 43g and the back part 43b, and the notch 67 is inserted from the rear side of the vehicle into the convex portion 43e as illustrated in FIG. 11.

The notch 67 of the intermediate area 63' receives a part of the main body casing 43, and the through-hole 66' of the intermediate area 63' arranged around the notch 67 is attached and fixed to the main body casing 43 by the fixing means (the bolt 69 and the nut 70), whereby the intermediate area 63' is fixed in close contact with the main body casing 43 to reinforce the rigidity of the main body casing 43.

The main body casing 43 is made of light metal and is, for example, a casting containing aluminum as the main component. In addition, the suspension bracket 61' is made of steel and has higher rigidity than the main body casing 43. In the present embodiment, the bolt 69, the nut 70, the through-holes 43h and 66' are provided as the fixing means, and the through-holes 43h and 66' are not female screw holes but round holes. According to the present embodiment, it is unnecessary to provide a female screw hole in the main body casing 43 since the through-hole 43h as the round hole is provided in the main body casing 43. In addition, it is unnecessary to provide a female screw hole in the suspension bracket 61' since the through-hole 66' as the round hole is provided in the suspension bracket 61' according to the present embodiment. Alternatively, the suspension bracket 61' may be made of light metal, and may be, for example, a casting containing aluminum as the main component.

Figure 13:
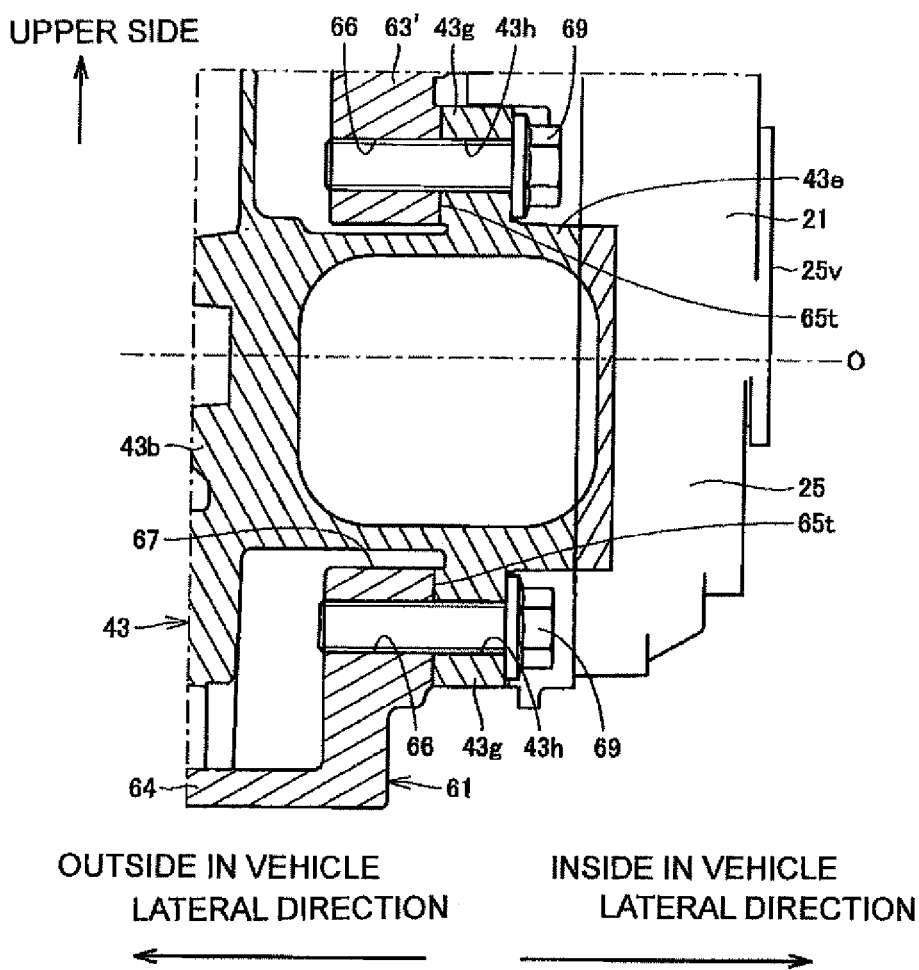
FIG. 13 is a cross-sectional view illustrating a fixing means of a modified example.

In addition, here, a modified example illustrated in FIG. 13 may be used instead of the embodiment illustrated in FIG. 11 as the fixing means for attaching and fixing the suspension bracket 61' to the main body casing 43. In the fixing means of the modified example, the female screw hole 66 is formed in the intermediate area 63 instead of the through-hole 66' which is the round hole. Each of the bolts 69 is screwed into the female screw hole 66. As a result, the nut 70 (FIG. 11) can be omitted.

Meanwhile, according to the embodiments described so far, provided are: the wheel hub bearing unit 11 including the inner ring 12 which is the rotating wheel integrally rotating with the wheel, the outer ring 13 which is the fixed wheel arranged coaxially with the inner ring 12, and the plurality of rolling elements 14 arranged in the annular gap between the rotating wheel and the fixed wheel; the motor unit 21 that drives the rotating wheel; the speed reduction unit 31 that decelerates the rotation of the motor unit 21 and transmits the decelerated rotation to the rotating wheel; the suspension bracket 61 or 61' that has the upper connecting seat portion 62 connectable with the suspension device, the lower connecting seat portion 64 connectable with the suspension device, and the intermediate area 63 or 63' connecting the vehicle rear part of the upper connecting seat portion 62 and the vehicle rear part of the lower connecting seat portion 64, and defines the notch 67 between the vehicle front part of the upper connecting seat portion 62 and the vehicle front part of the lower connecting seat portion 64 on the front side of the vehicle of the intermediate area 63 or 63'; and the fixing means (the bolt 69, the female screw hole 66, or the through-holes 43h and 66') for attaching and fixing the suspension bracket 61 or 61' to the main body casing 43 of the speed reduction unit 31 and/or the fixed wheel in the posture in which the axis O of the wheel hub bearing unit 11 passes through the notch 67. As a result, the suspension bracket 61 can receive an excessive external force even if the excessive external force is applied from the wheel to the in-wheel motor drive device. Therefore, the excessive external force is hardly transmitted to the casing of the in-wheel motor drive device so that it is possible to protect the in-wheel motor drive device so as not to cause an undesirable deformation.

In addition, the rolling bearing 45n is arranged close to the notch 67 of the suspension bracket 61 such that the position of the rolling bearing 45n in the direction of the axis O can overlap with the position of the suspension bracket 61 in the direction of the axis O as illustrated in FIG. 6. In addition, the convex portion 43e attached to the main body casing 43 can be arranged in the notch 67 as illustrated in FIG. 11. Alternatively, for example, a sensor that monitors the inside of the main body casing 43 can be arranged in the notch 67 although not illustrated. Accordingly, it is possible to achieve the miniaturization of the in-wheel motor drive device 10 or 20.

In addition, according to the above-described embodiment, the motor unit 21 is arranged to be offset away from the axis O of the wheel hub bearing unit 11, the speed reduction unit 31 further has the input gear 33 coupled to the motor rotary shaft 22 of the motor unit 21, the output gear 40 coupled to the rotating wheel of the wheel hub bearing unit 11, and the rolling bearing 45n rotatably supporting the output gear 40 on the main body casing 43, and the rolling bearing 45n is arranged in the notch 67 so as not to partially overlap with the intermediate area 63 of the suspension bracket 61 as viewed in the direction of the axis O of the wheel hub bearing unit 11.

In addition, according to the above-described embodiments, the suspension bracket 61 is arranged such that the position of the suspension bracket 61 in the direction of the axis O partially overlaps with the position of the rolling bearing 45n in the axis O direction with respect to the axis O of the wheel hub bearing unit 11 as illustrated in FIG. 6, thereby contributing to the miniaturization of the in-wheel motor drive device 10.

In addition, according to the above-described embodiment, the suspension bracket 61 has the butt surfaces 65t on the upper side and the lower side, the bolts 69 as the fixing means are provided on the butt surface 65t on the upper side and the butt surface 65t on the lower side to bring these butt surfaces 65t into contact with the hub attachment 15 of the fixed wheel, and the butt surface 65t at the distal end of the protruding portion 65 is arranged on the outer diameter side of the output gear 40 as viewed in the direction of the axis O of the wheel hub bearing unit 11 with reference to FIG. 3. As a result, the connection rigidity between the hub attachment 15 and the suspension bracket 61 is improved. Incidentally, as a modified example (not illustrated), the butt surface 65t of the suspension bracket 61' may be brought into contact with the main body casing 43 of the speed reduction unit 31 and arranged on the outer diameter side of the output gear 40.

In addition, according to the above-described embodiments, the suspension bracket 61 or 61' is arranged so as not to overlap with the stator 24 of the motor unit 21 as viewed in the direction of the axis O of the wheel hub bearing unit 11 as illustrated in FIGS. 3 and 9. The suspension bracket 61 is arranged on the outer diameter side of an outer circumferential surface of the motor unit 21 with respect to the axis M so that the motor unit 21 is separated from the wheel hub bearing unit 11 and the suspension bracket 61.

Further, the external force applied from the wheel to the wheel hub bearing unit 11 can be accepted by the suspension bracket 61 or 61' and prevented from being applied to the stator of the motor unit 21.

In addition, according to the above-described embodiments, the rotating wheel of the wheel hub bearing unit 11 is the inner ring 12, the fixed wheel of the wheel hub bearing unit 11 is the outer ring 13, the wheel hub bearing unit 11 further has the hub attachment 15 which is arranged on the outer diameter side of the outer ring 13 and is attached and fixed to the outer ring 13, and the suspension bracket 61 is attached and fixed to the hub attachment 15 using the bolt 69 serving as the fixing means. As a result, the suspension bracket 61 can accept the external force applied from the wheel to the wheel hub bearing unit 11, and it is possible to prevent the speed reduction unit 31 and the motor unit 21 from being deformed as the external force is transmitted to the main body casing 43 and the motor unit 21.

Although the embodiments of the present invention have been described with reference to the drawings as above, the present invention is not limited to the illustrated embodiments. Various corrections and modifications can be made with respect to the illustrated embodiments within the same scope as the present invention or within an equivalent scope.

INDUSTRIAL APPLICABILITY

The in-wheel motor drive device according to the present invention is advantageously used in electric cars and hybrid vehicles.

REFERENCE SIGNS LIST 10 in-wheel motor drive device
11 wheel hub bearing unit
12 inner ring (rotating wheel)
13 outer ring (fixed wheel)
14 rolling element
15 hub attachment
15a upper part
15b lower part
15c circular part
15t, 65t, butt surface
21 motor unit
22 motor rotary shaft
23 rotor
24 stator (stator core)
24a one axial end face
24b other axial end face
25 motor casing
25v motor casing cover
31 speed reduction unit
32 input shaft
33 input gear
34, 36 intermediate gear
35 intermediate shaft
40 output gear
41 output shaft
43 main body casing
43b back part
43e convex portion
43f front part
43g protrusion
47 oil tank
61 suspension bracket
62 upper connecting seat portion
62d slit
63 intermediate area
64 lower connecting seat portion
65 protruding portion
66 female screw hole
68 tie rod arm
69 bolt (fixing means)
70 nut (fixing means)
71 lower arm (suspension member)
72 ball joint
72d ball stud
72s socket
76 strut (damper)
K steering axis
M, N, O axis
V opening

The invention claimed is:

1. An in-wheel motor drive device comprising:
a motor unit;
a wheel hub bearing unit that has a rotating wheel rotating integrally with a wheel, a fixed wheel arranged coaxially with the rotating wheel, and a plurality of rolling elements arranged in an annular gap between the rotating wheel and the fixed wheel;
a speed reduction unit that decelerates rotation of the motor unit and transmits the decelerated rotation to the rotating wheel;
a suspension bracket that has an upper connecting seat portion connectable with a suspension device, a lower connecting seat portion connectable with the suspension device, and an intermediate area connecting a vehicle rear part of the upper connecting seat portion and a vehicle rear part of the lower connecting seat portion, and defines a notch between a vehicle front part of the upper connecting seat portion and a vehicle front part of the lower connecting seat portion on a front side of the vehicle of the intermediate area; and
a fixing means for attaching and fixing the suspension bracket to a casing of the speed reduction unit and/or the fixed wheel in a posture in which an axis of the wheel hub bearing unit passes through the notch.

2. The in-wheel motor drive device according to claim 1, wherein
the motor unit is arranged to be offset away from the axis of the wheel hub bearing unit,
the speed reduction unit further has an input gear coupled to a motor rotary shaft of the motor unit, an output gear coupled to the rotating wheel of the wheel hub bearing unit, and a rolling bearing rotatably supporting the output gear on the casing, and
the rolling bearing is arranged in the notch so as not to overlap with the intermediate area of the suspension bracket as viewed in an axial direction of the wheel hub bearing unit.

3. The in-wheel motor drive device according to claim 2, wherein the suspension bracket is arranged such that an axial position of the suspension bracket overlaps with an axial position of the rolling bearing with respect to the axis of the wheel hub bearing unit.

4. The in-wheel motor drive device according to claim 2, wherein
the suspension bracket has an upper butt surface and a lower butt surface,
the fixing means is provided on the upper butt surface and the lower butting butt surface to bring the butt surfaces into contact with the casing of the speed reduction unit or the fixed wheel, and
the upper butt surface and the lower butt surface are arranged on an outer diameter side of the output gear as viewed in the axial direction of the wheel hub bearing unit.

5. The in-wheel motor drive device according to claim 1, wherein the suspension bracket is arranged so as not to overlap with a stator of the motor unit as viewed in the axial direction of the wheel hub bearing unit.

6. The in-wheel motor drive device according to claim 1, wherein
 the rotating wheel is an inner ring, and the fixed wheel is an outer ring,
 the wheel hub bearing unit further has a hub attachment which is arranged on an outer diameter side of the outer ring and is attached and fixed to the outer ring, and
 the suspension bracket is attached and fixed to the hub attachment by the fixing means.

* * * * *